US011923953B2

(12) United States Patent
Sai

(10) Patent No.: US 11,923,953 B2
(45) Date of Patent: Mar. 5, 2024

(54) WIRELESS COMMUNICATION DEVICE, SYSTEM, COMPUTER-READABLE STORAGE MEDIUM, AND CONTROL METHOD

(71) Applicant: HAPSMobile Inc., Tokyo (JP)

(72) Inventor: Jutatsu Sai, Kanagawa (JP)

(73) Assignee: SoftBank Corp., Tokyo (JP)

( * ) Notice: Subject to any disclaimer, the term of this patent is extended or adjusted under 35 U.S.C. 154(b) by 266 days.

(21) Appl. No.: 17/483,848

(22) Filed: Sep. 24, 2021

(65) Prior Publication Data
US 2022/0014259 A1 Jan. 13, 2022

Related U.S. Application Data

(63) Continuation of application No. PCT/JP2020/002819, filed on Jan. 27, 2020.

(30) Foreign Application Priority Data

Mar. 28, 2019 (JP) ................................ 2019-063376

(51) Int. Cl.
*H04B 7/185* (2006.01)
*H04B 17/24* (2015.01)
(Continued)

(52) U.S. Cl.
CPC ......... *H04B 7/18504* (2013.01); *H04B 17/24* (2015.01); *H04W 16/28* (2013.01); *H04W 24/10* (2013.01)

(58) Field of Classification Search
CPC .... H04B 7/024; H04B 7/0626; H04B 7/0404; H04B 7/0456; H04B 7/0486;
(Continued)

(56) References Cited

U.S. PATENT DOCUMENTS

2005/0037749 A1   2/2005   Karabinis
2007/0135051 A1*  6/2007   Zheng ................ H04B 7/18513
                                              455/427
(Continued)

FOREIGN PATENT DOCUMENTS

JP    2002211496 A   7/2002
JP    2007501546 A   1/2007
(Continued)

OTHER PUBLICATIONS

Office Action issued for counterpart Japanese Application No. 2019-063376, issued by the Japan Patent Office dated May 31, 2022 (drafted on May 26, 2022).
(Continued)

*Primary Examiner* — Ajibola A Akinyemi

(57) ABSTRACT

There is provided a wireless communication device, comprising: a plurality of radio units including a first radio unit and a second radio unit; and a control unit configured to control the plurality of radio units to form a multi-cell on the ground, wherein the control unit has a removal processing performing unit configured to perform, based on a first reception radio wave in which the first radio unit received a first transmission radio wave which includes a first signal transmitted by a first user terminal, and a second reception radio wave in which the second radio unit received a second transmission radio wave which includes a second signal transmitted by a second user terminal, removal processing to remove a component of the first transmission radio wave contained as an interference wave in the second reception radio wave.

18 Claims, 8 Drawing Sheets

(51) Int. Cl.
*H04W 16/28* (2009.01)
*H04W 24/10* (2009.01)

(58) Field of Classification Search
CPC .. H04B 7/0639; H04B 7/0695; H04B 17/318;
H04B 17/336; H04B 7/00; H04B 7/0417;
H04B 7/0452; H04B 7/0619; H04B
7/0615; H04B 7/0617; H04B 7/0628;
H04B 17/24; H04B 17/345; H04B
7/0413; H04B 7/0632; H04B 7/0634;
H04B 7/0857; H04B 7/088; H04B
7/0641; H04B 7/065
USPC ............................................................ 455/9
See application file for complete search history.

(56) References Cited

U.S. PATENT DOCUMENTS

| | | | | |
|---|---|---|---|---|
| 2014/0314033 | A1* | 10/2014 | Ohwatari | H04W 36/08 370/329 |
| 2017/0238327 | A1* | 8/2017 | Ku | H04L 1/06 370/336 |
| 2018/0083726 | A1 | 3/2018 | Mitton, Jr. | |
| 2019/0116524 | A1 | 4/2019 | Isogawa | |

FOREIGN PATENT DOCUMENTS

| | | |
|---|---|---|
| JP | 2008527845 A | 7/2008 |
| JP | 2013106112 A | 5/2013 |
| WO | 2017175606 A1 | 10/2017 |

OTHER PUBLICATIONS

Shibata Yohei et al.,"A Study on Cell Configuration for HAPS Mobile Communications", IEICE Technical Report Institute of Electronics, Information and Communication Engineers, pp. 101-106, vol. 118 Issue: 372.

(ISA/237) Written Opinion of the International Search Authority for International Patent Application No. PCT/JP2020/002819, mailed by the Japan Patent Office dated Apr. 7, 2020.

Extended European Search Report for European Patent Application No. 20776851.6, issued by the European Patent Office dated Apr. 19, 2022.

Liang Liu et al: "Multi-Beam UAV Communication in Cellular Uplink:Cooperative Interference Cancellation and Sum-Rate Maximization", arxiv.org, Cornell University Library, 201 Olin Library Cornell University Ithaca, NY14853, Aug. 1, 2018 (Aug. 1, 2018), XP081411211, pp. 1-29.

* cited by examiner

WIRELESS COMMUNICATION DEVICE, SYSTEM, COMPUTER-READABLE STORAGE MEDIUM, AND CONTROL METHOD

The contents of the following Japanese patent application are incorporated herein by reference:
No. 2019-063376 filed in JP on Mar. 28, 2019
No. PCT/JP2020/002819 filed in WO on Jan. 27, 2020

BACKGROUND

1. Technical Field

The present invention relates to a wireless communication device, a system, a computer-readable storage medium, and a control method.

2. Related Art

Flying bodies have been known that have antennas and fly in the stratosphere for providing stratospheric platforms (see, e.g., Patent Document 1).

PRIOR ART DOCUMENT

Patent Document

Patent Document 1: Japanese Patent Application Publication No. 2002-211496

DESCRIPTION OF EXEMPLARY EMBODIMENTS

In providing wireless communication services to a plurality of user terminals on the ground by means of a flying body, it is desirable to provide techniques that can suppress degradation in the communication quality.

While the present invention will be described below by means of the embodiments of the invention, these embodiments below are not intended to limit the invention defined by the claims. All combinations of features set forth in the embodiments are not necessarily essential to the solutions of the present invention.

Figure 1:
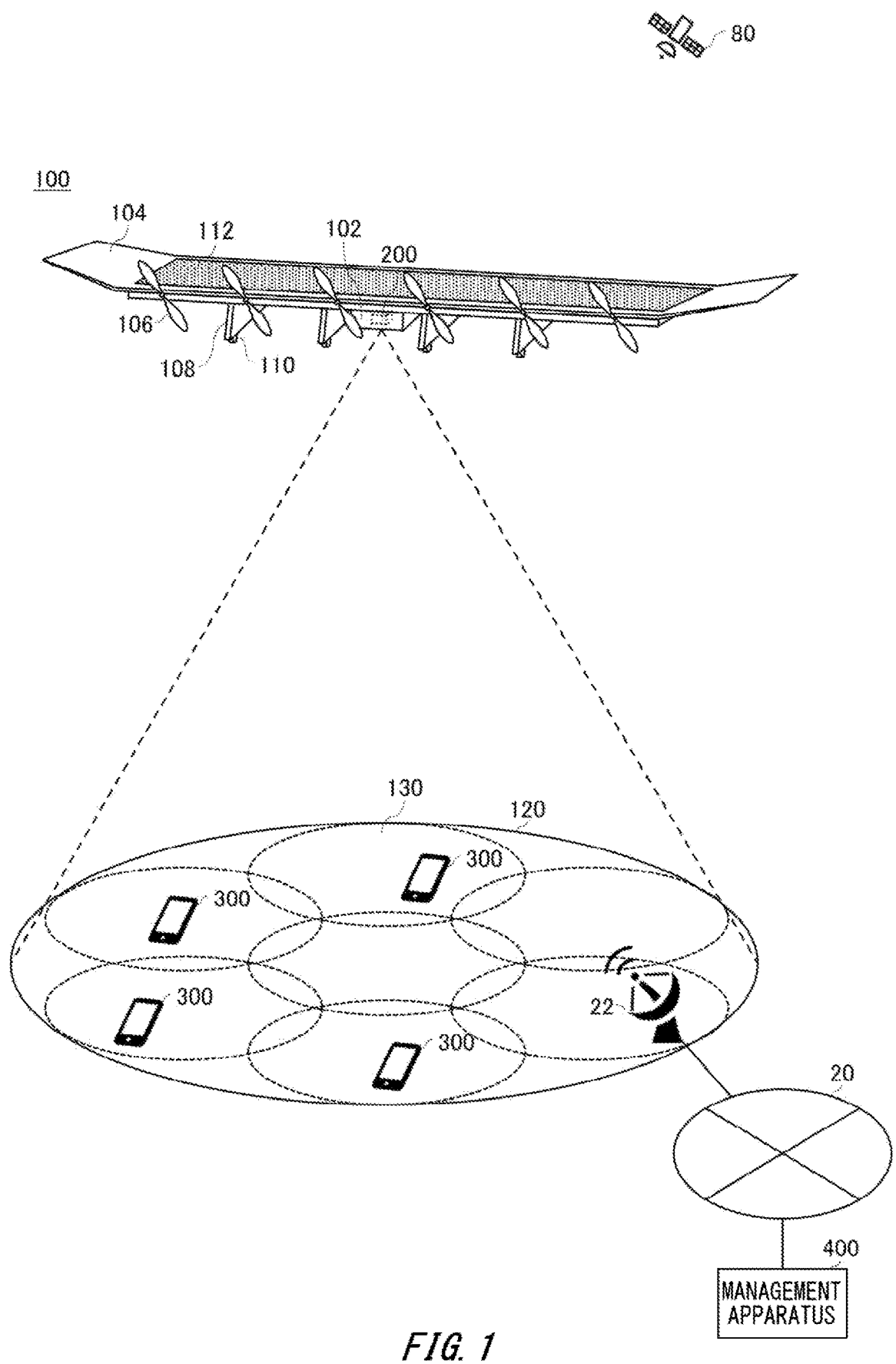
FIG. 1 shows schematically an example of a flying body 100.

FIG. 1 shows schematically an example of a flying body 100. The flying body 100 has a body unit 102, a main wing unit 104, propellers 106, skids 108, wheels 110, and solar cell panels 112.

The body unit 102 comprises a wireless communication device 200, as well as a battery and a flight control apparatus that are not shown. The battery accumulates power generated by the solar cell panels 112. The flight control apparatus controls flights of the flying body 100. The flight control apparatus, for example, rotates the propellers 106 using the power accumulated in the battery to fly the flying body 100. The wireless communication device 200 radiates a plurality of beams toward the ground, thereby forming a multi-cell 120 composed of a plurality of cells 130 to provide wireless communication services to a user terminal 300 in the multi-cell 120. The wireless communication device 200 and the flight control apparatus may be integral with each other.

The flying body 100, for example, flies in the stratosphere to provide the wireless communication services to the user terminal 300 on the ground. The flying body 100 may function as a stratosphere platform.

The user terminal 300 may be any terminal as long as it is a communication terminal communicable with the flying body 100. For example, the user terminal 300 is a mobile phone such as a smart phone. The user terminal 300 may be such as a tablet terminal and a PC (Personal Computer). The user terminal 300 may be a so-called IoT (Internet of Thing) device. The user terminal 300 may include any device applicable to a so-called IoE (Internet of Everything).

The flying body 100, for example, covers the ground area by the multi-cell 120 while circulating above the ground area targeted for coverage. The flying body 100 circling around above the ground area may be described as a fixed point flight. In addition, the flying body 100 covers the whole ground area by moving above the ground area while covering a portion of the ground area targeted for coverage by the multi-cell 120.

The flying body 100, for example, relays communication between the user terminal 300 and a network 20 on the ground to provide wireless communication services to the user terminal 300. The network 20 may include a core network provided by a telecommunication carrier. The core network may comply with any mobile communication system, and for example, complies with a 3G (3rd Generation) communication system, an LTE (Long Term Evolution) communication system, a 4G (4th Generation) communication system, and a 5G (5th Generation) communication system and subsequent mobile communication systems. The network 20 may include the Internet.

The flying body 100, for example, communicates with the network 20 on the ground via a gateway 22 in the multi-cell 120 among the gateways 22 arranged on various locations on the ground. In addition, for example, the flying body 100 communicates with the network 20 via a communication satellite 80. In this case, the flying body 100 has an antenna for communicating with the communication satellite 80.

The flying body 100, for example, transmits data received from the user terminal 300 in the multi-cell 120 to the network 20. In addition, for example, when data directed to the user terminal 300 in the multi-cell 120 is received via the network 20, the flying body 100 transmits such data to the user terminal 300.

The flying body 100 may be controlled by a management apparatus 400 on the ground. The flying body 100, for example, flies or forms the multi-cell 120 in accordance with an instruction transmitted by the management apparatus 400 via the network 20 and the gateway 22. The management apparatus 400 may transmit instructions to the flying body 100 via the communication satellite 80.

The wireless communication device 200 comprises a BBU (Base Band Unit) and a plurality of RRHs (Remote Radio Heads). The BBU causes each of the plurality of RRHs to form the cell 130, thereby forming the multi-cell 120. The BBU may be an example of a control unit. The RRH may be an example of a radio unit.

The wireless communication device 200 mounted to the flying body 100 will be subject to size constraints, so that the plurality of RRHs will be closely arranged. As the number of the cells 130 composing the multi-cell 120 increases, the distance between the plurality of RRHs decreases. Thus, unlike ground radio base stations which are installed in locations geographically remote from each other, the uplink interference may possibly become significant, so that uplink interference countermeasures constitute the critical challenge. The wireless communication device 200 according to the present embodiment provides the technique to reduce the uplink interference.

In addition, when functioning as the stratosphere platform, the wireless communication device 200 is considered to change dynamically the number of beams, the number of cells, the position of a footprint, the size of the footprint, and the shape of the footprint or the like, depending on such as the position for the flying body 100 to fly and the condition of the ground to be covered. Along with such changes, the relationship between each of the plurality of cells 130 composing the multi-cell 120 and the neighboring cell can be changed dynamically. Thereby, the uplink interference countermeasures depending on such changes in the conditions can also constitute the critical challenge. The wireless communication device 200 according to the present embodiment can provide the technique that handles such changes in the conditions.

Figure 2:
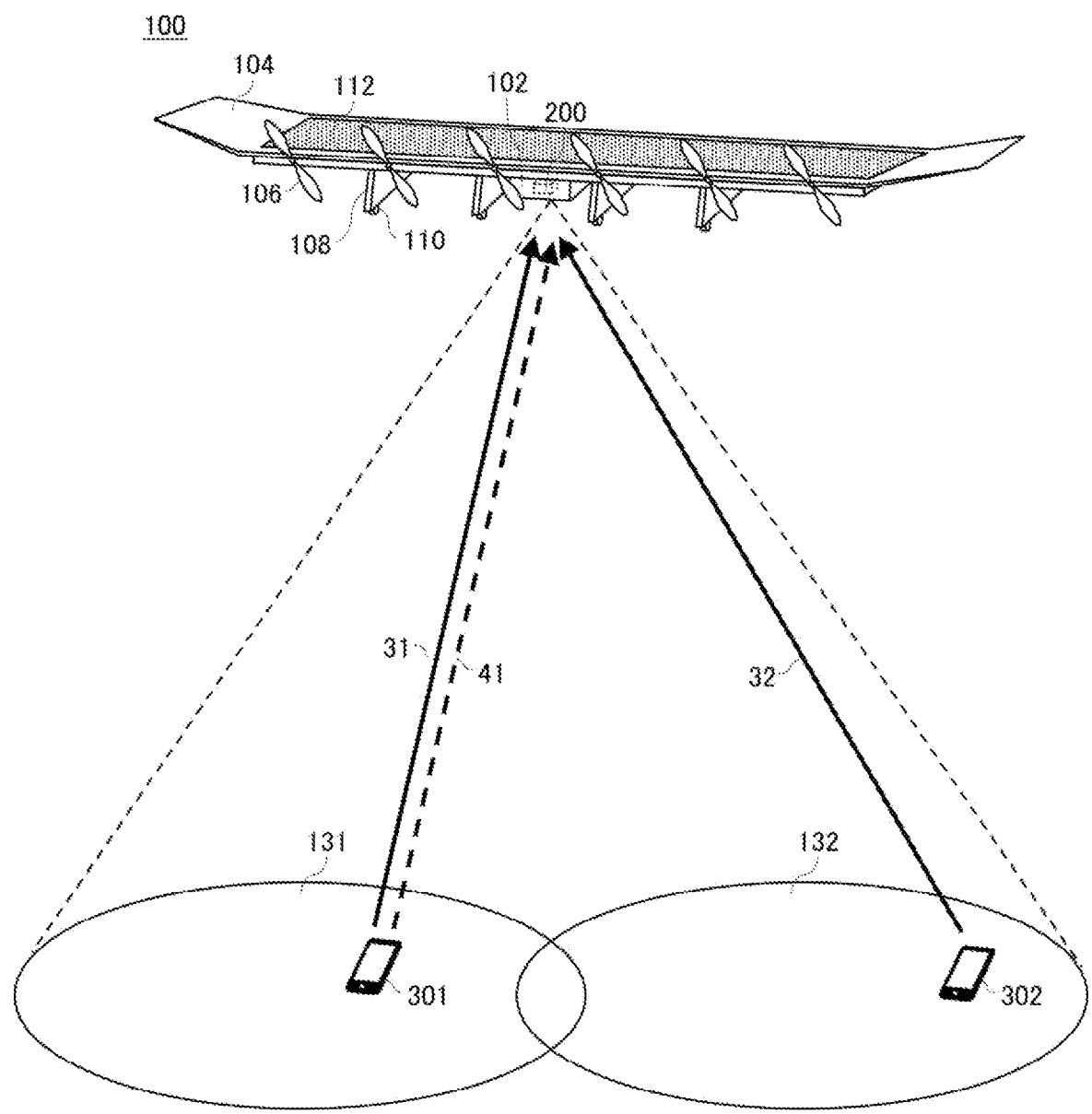
FIG. 2 illustrates a content of processing by a wireless communication device 200.
Figure 3:
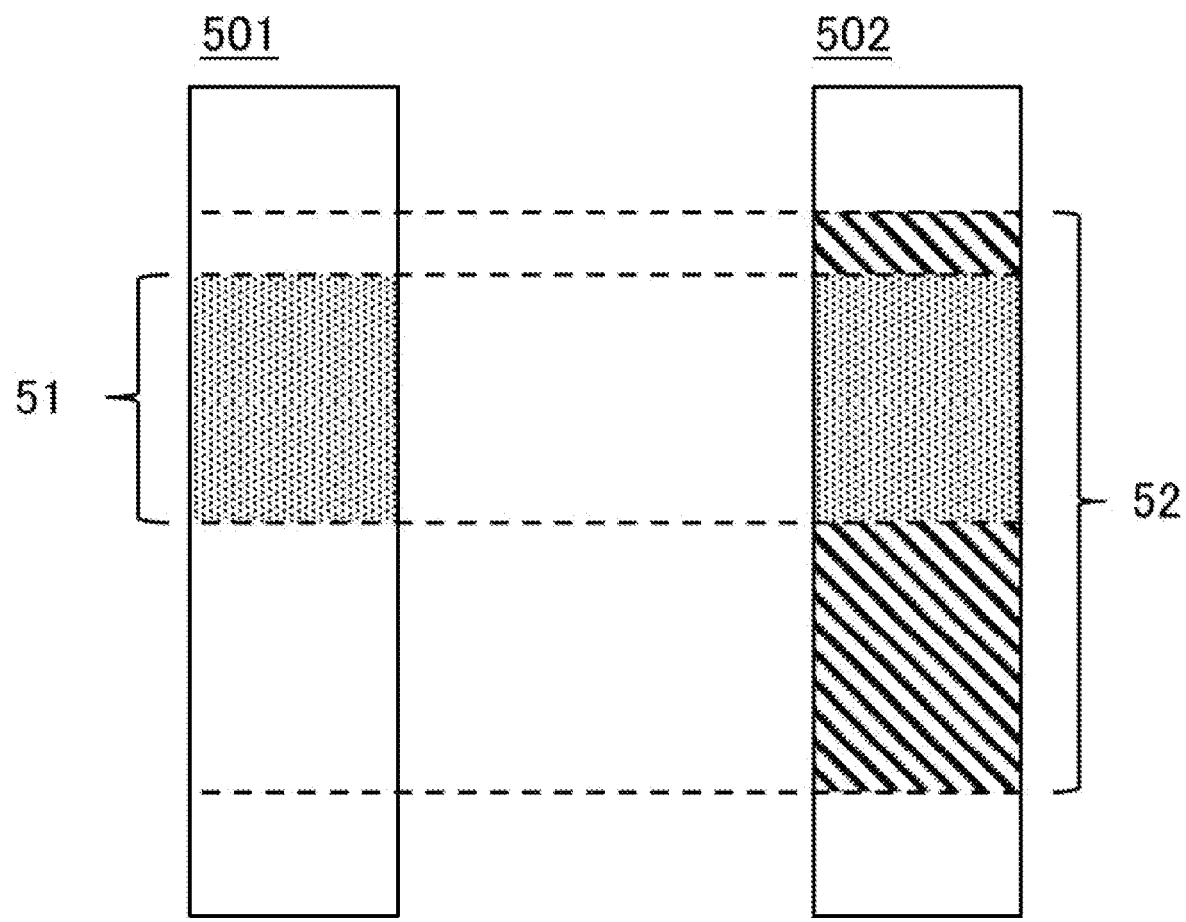
FIG. 3 illustrates a content of processing by the wireless communication device 200.
Figure 4:
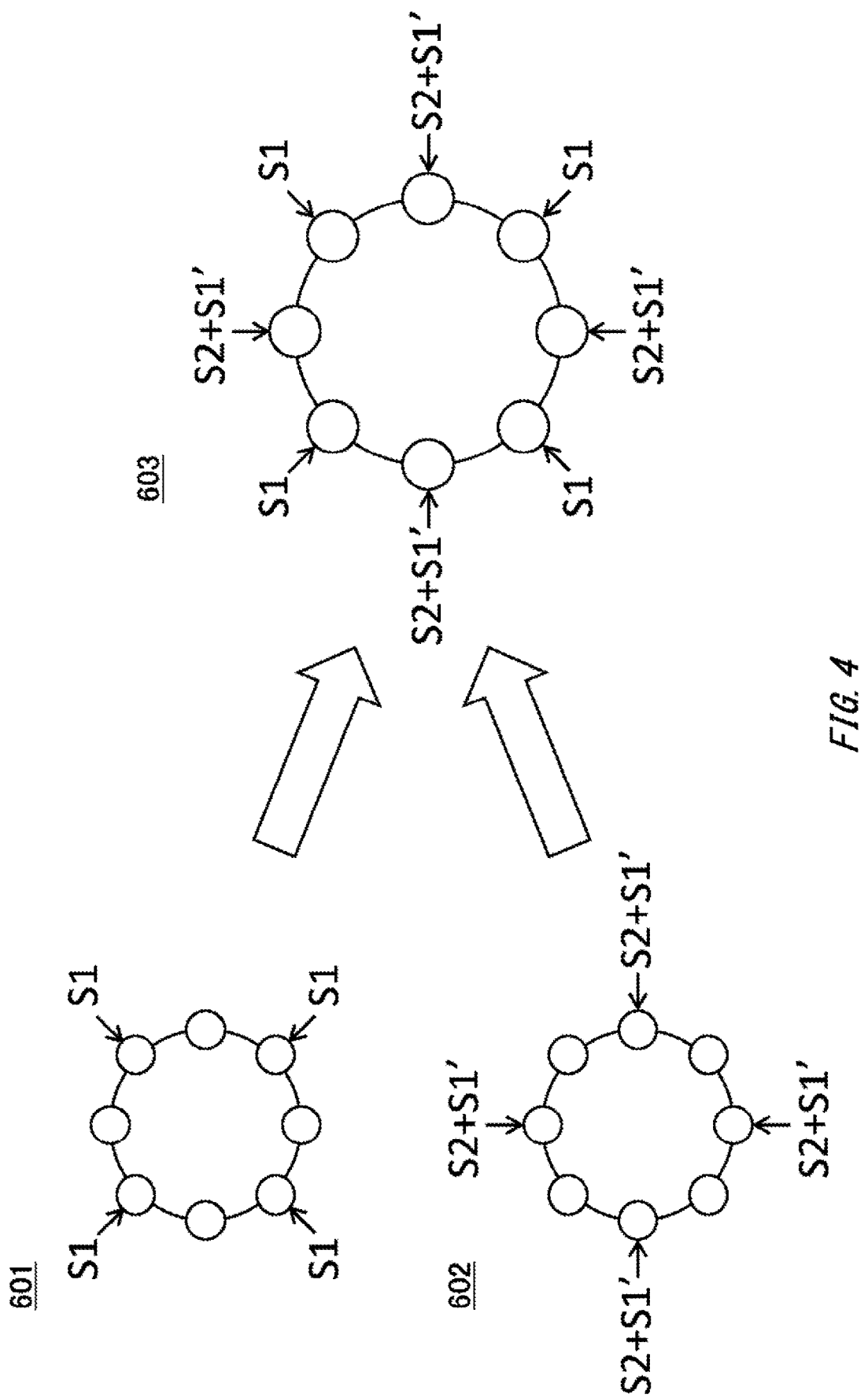
FIG. 4 illustrates a content of processing by the wireless communication device 200.

FIG. 2 through FIG. 4 illustrate contents of processing by the wireless communication device 200. In FIG. 2, while only two cells 131 and 132 are shown among the plurality of cells 130 included in the multi-cell 120 produced by the wireless communication device 200, the illustration of other cells is omitted. In addition, as examples of the user terminal 300 located in the area of the cell 131 and the user terminal 300 located in the area of the cell 132, the user terminal 301 and the user terminal 302 are illustrated.

That the user terminal 300 is located in the area of the cell 130 may mean that the user terminal 300 is placed in the cell 130 and has established the wireless communication connection with the wireless communication device 200. In the example shown in FIG. 2, the user terminal 301 is located in the area of the cell 131 formed by a first RRH among the plurality of RRHs. In addition, the user terminal 302 is located in the area of the cell 132 formed by a second RRH among the plurality of RRHs.

In the example shown in FIG. 2, the user terminal 301 outputs a transmission radio wave containing a transmission signal 31, and the user terminal 302 outputs a transmission radio wave containing a transmission signal 32, wherein a component of the transmission radio wave output by the user terminal 301 is contained as an interference wave in the transmission radio wave containing the transmission signal 32. In this manner, a signal interfering with the transmission signal 32 is illustrated as an interference signal 41. In the wireless communication device 200 mounted to the flying body 100, the plurality of RRHs are closely arranged, possibly generating such uplink interference.

FIG. 3 illustrates a reception radio wave band 501 that indicates the band of the reception radio wave received by the first RRH forming the cell 131, the reception radio wave being the transmission radio wave containing the transmission signal 31 transmitted by the user terminal 301, and a reception radio wave band 502 that indicates the band of the reception radio wave received by the second RRH forming the cell 132, the reception radio wave being the transmission radio wave containing the transmission signal 32 transmitted by the user terminal 302. As shown in FIG. 3, the reception radio wave band 501 contains a signal 51 corresponding to the transmission signal 31. The reception radio wave band 502 contains a signal 52 corresponding to the transmission signal 32 interfered with the interference signal 41.

For example, the LTE communication system utilizes an identical frequency band for the plurality of cells 130. Since the allocation control of radio resources is performed in one cell 130, the uplink interference is not generated in the one cell 130. However, since the allocation control of radio resources is performed in each of the plurality of cells 130, the identical frequency band can be allocated to the user terminals 300 located in areas of different cells 130. In addition, for the wireless communication device 200 mounted to the flying body 100, the plurality of RRHs are closely arranged, possibly generating the interference as described above.

A BBU 210 according to the present embodiment performs, based on the first reception radio wave in which the first transmission radio wave containing the transmission signal 31 transmitted by the user terminal 301 is received by the first RRH, and the second reception radio wave in which the second transmission radio wave containing the transmission signal 32 transmitted by the user terminal 302 is received by the second RRH, removal processing to remove a component of the first transmission radio wave contained as an interference wave in the second reception radio wave. The BBU 210 may acquire the signal 52 from the second reception radio wave by performing such removal processing.

The BBU 210, for example, performs the removal processing to remove a component of the first transmission radio wave contained as the interference wave in the second reception radio wave by utilizing the UL-CoMP technique. The BBU 210, for example, acquires a second signal from the second reception radio wave by synthesizing the signal 51 acquired from the first reception radio wave and the signal 52 acquired from the second reception radio wave to remove the signal contained as an interference signal in the second reception radio wave.

FIG. 4 shows conceptually a content of the removal processing. The BBU 210 can remove an interference wave signal by assuming that: as shown as a reception signal 601, the first RRH receives the transmission signal 31 (which may be described as S1) through four antennas out of eight antennas; as shown in a reception signal 602, the second RRH receives a signal (which may be described as S2+S1') composed of the transmission signal 32 (which may be described as S2) containing the interference signal 41 (which may be described as S1') through four antennas out of the eight antennas; and as shown in a reception signal 603, the cell of the eight antennas is subject to the interference wave.

The BBU 210, for example, passes the signal S1 received at the cell 131 to the cell 132 side through a backplane. The BBU 210, for example, passes the signal S1 received at the cell 131 to the cell 132 side via the SRIO (Serial Rapid IO) Switching. Then, the BBU 210 synthesizes S1 and S2+S1' as shown in the reception signal 603. Since the phase of the signal S1 received at the cell 131 can be identified, the BBU 210 can identify the interference signal S1' contained in S2+S1' and can remove S1' from S2+S1'.

Figure 5:
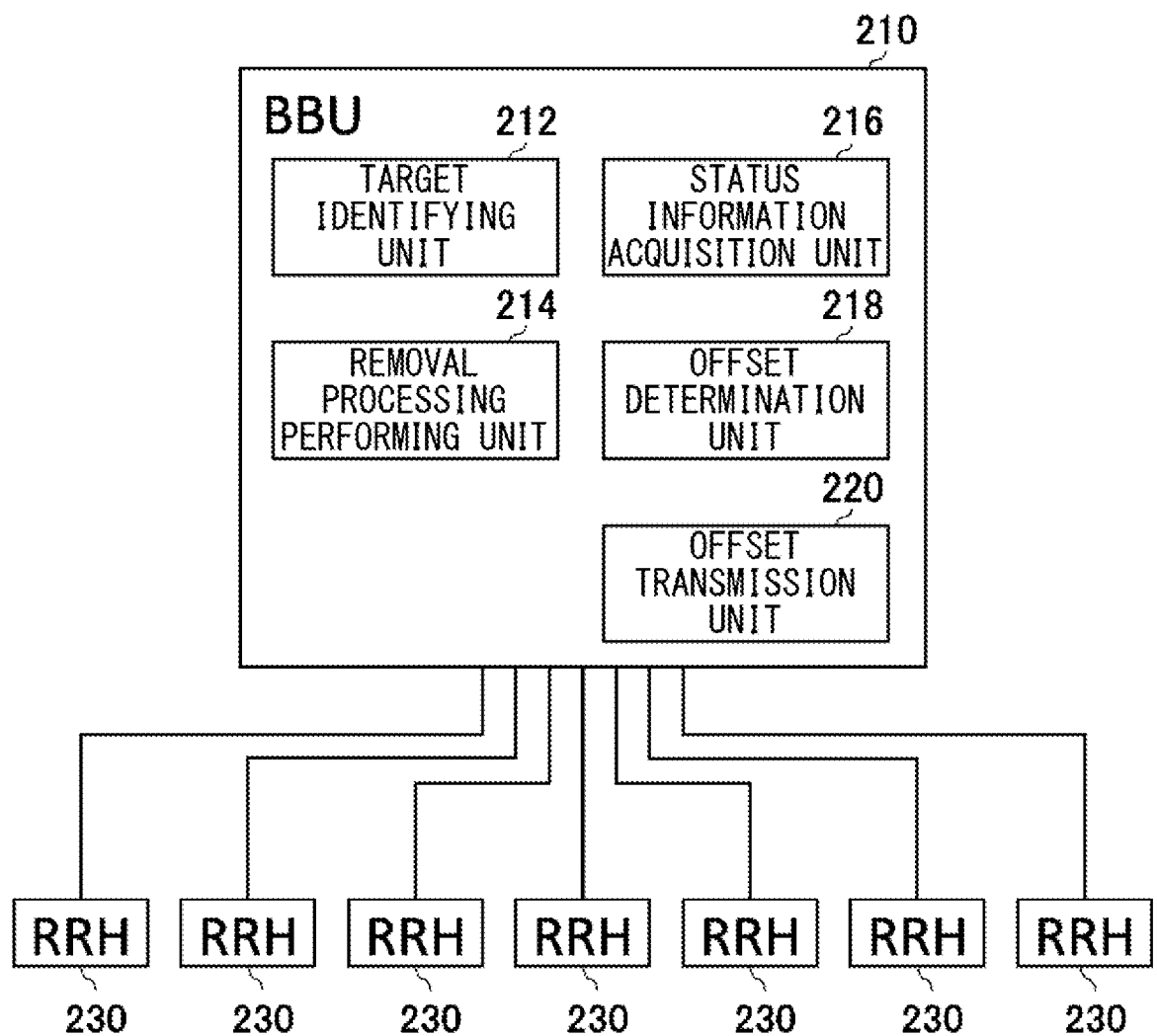
FIG. 5 shows schematically an example of a functional configuration of the wireless communication device 200.

FIG. 5 shows schematically an example of a functional configuration of the wireless communication device 200.

Herein, the case where the wireless communication device 200 comprises one BBU 210 and seven RRHs 230 is shown. The BBU 210 can cause each of the seven RRHs 230 to form a cell, thereby forming a multi-cell consisting of seven cells. The number of the RRHs 230 included in the wireless communication device 200 may not be limited thereto, and the wireless communication device 200 may comprise any number of RRHs.

The BBU 210 has a target identifying unit 212, a removal processing performing unit 214, a status information acquisition unit 216, an offset determination unit 218, and an offset transmission unit 220. The BBU 210 does not necessarily have all of these configurations.

The target identifying unit 212 identifies, from the plurality of RRHs 230, the RRH 230 forming the cell 130 acting as an interference source and the RRH 230 forming the cell 130 targeted for reducing the interference. The target identifying unit 212, for example, based on a measurement report which is transmitted by the user terminal 300 located in an area of any of the plurality of cells 130 and reporting the condition of the radio wave received by the user terminal 300, identifies the cell 130 acting as the interference source and the cell 130 targeted for reducing the interference. Such a measurement report may be a so-called MR (Measurement Report).

The target identifying unit 212, for example, upon receiving the MR transmitted by the user terminal 300 according to a transmission trigger of an A3 event in an event-type trigger, identifies the cell 130 acting as the interference source and the cell 130 targeted for reducing the interference. The target identifying unit 212 may, by referring to the MR, when such MR is received which is transmitted by the user terminal 300 located in an area of a certain cell 130 if the reception quality of a radio wave from a neighboring cell is higher than the reception quality of a radio wave from the own cell by a predetermined or larger amount of offset, determine the neighboring cell in the MR as the cell 130 targeted for reducing the interference and determine the own cell in the MR as the cell 130 acting as the interference source.

The removal processing performing unit 214 performs the removal processing for the cell 130 targeted for reducing the interference which is identified by the target identifying unit 212. The removal processing performing unit 214 performs the removal processing to remove a component of the first transmission radio wave contained as the interference wave in the second reception radio wave, for example, based on the first reception radio wave in which the first RRH 230 forming the cell 130 received the first transmission radio wave which includes a first signal transmitted by the user terminal 300 which is located in the area of the cell 130 acting as the interference source and has transmitted the MR, and the second reception radio wave in which the second RRH 230 forming the cell 130 received the second transmission radio wave which includes the second signal transmitted by the user terminal 300 located in the area of the cell 130 which is targeted for reducing the interference. The removal processing performing unit 214 acquires the second signal from the second reception radio wave by performing the removal processing.

The removal processing performing unit 214, for example, performs the removal processing to remove a component of the first transmission radio wave contained as the interference wave in the second reception radio wave by utilizing the UL-CoMP technique. The removal processing performing unit 214 may acquire the second signal from the second reception radio wave by synthesizing a signal acquired from the first reception radio wave and a signal acquired from the second reception radio wave to remove the first signal contained as the interference signal in the second reception radio wave. The removal processing performing unit 214 may assume, based on the first reception radio wave received by the first RRH 230 through a first plurality of antennas and the second reception radio wave received by the second RRH 230 through a second plurality of antennas, that a cell composed of the first plurality of antennas and the second plurality of antennas has received the first reception radio wave and the second reception radio wave, thereby removing a component of the first transmission radio wave contained as the interference wave in the second reception radio wave.

The removal processing performing unit 214 may remove a component of the first transmission radio wave from the second reception radio wave by identifying the component of the first transmission radio wave contained as the interference wave in the second reception radio wave by means of a phase derived from the first reception radio wave. Thereby, the second signal can be acquired by removing the component of the first signal contained as the interference signal in the signal contained in the second reception radio wave.

The status information acquisition unit 216 acquires status information that indicates a status of the flying body 100 having the wireless communication device 200 mounted thereto. The status information acquisition unit 216 may receive the status information from the flight control apparatus mounted to the flying body 100. The flight control apparatus, for example, transmits the status information that indicates changes in position information from a GPS or changes in attitudes of the flying body 100 from a gyro sensor to the wireless communication device 200.

The offset determination unit 218 determines, based on the status information acquired by the status information acquisition unit 216, an offset value at the A3 event transmitted to the user terminal 300 located in the area of the wireless communication device 200. The offset transmission unit 220 transmits the offset value determined by the offset determination unit 218 to the user terminal 300 located in the area of the wireless communication device 200.

The offset transmission unit 220, for example, first transmits a default offset value to the user terminal 300 located in the area of the wireless communication device 200. Note that the user terminal 300 may store the default offset value before being located in the area of the wireless communication device 200. The offset determination unit 218 determines the offset value if the status of the flying body 100 indicated by the status information acquired by the status information acquisition unit 216 satisfies a predetermined condition, and the offset transmission unit 220 transmits the offset value determined by the offset determination unit 218 to the user terminal 300 located in the area of the wireless communication device 200.

For example, the offset determination unit 218 determines an offset value smaller than the default offset value when a magnitude of flight vibration of the flying body 100 is greater than a predetermined magnitude. The flight vibration of the flying body 100 is the vertical vibration of the flying body 100, for example.

In addition, the flight vibration of the flying body 100 may be the pitch vibration of the flying body 100. That is, the flight vibration of the flying body 100 may be the rotational vibration about the lateral axis of the flying body 100.

Moreover, the flight vibration of the flying body 100 may be the roll vibration of the flying body 100. That is, the flight vibration of the flying body 100 may be the rotational vibration about the longitudinal axis of the flying body 100.

Furthermore, the flight vibration of the flying body 100 may be the yaw vibration of the flying body 100. That is, the flight vibration of the flying body 100 may be the rotational vibration about the vertical axis of the flying body 100.

It can be estimated that, when the flight vibration of the flying body 100 is large, variation in the footprint of the multi-cell 120 will also be large. Since the positional relationship between the user terminal 300 during communication and the neighboring cell varies as the footprint of the multi-cell 120 varies, the uplink interference as described above becomes more likely to be generated. In response thereto, lowering the offset value in the A3 event stored in the user terminal 300 can cause the user terminal 300 more likely to transmit the MR and the removal processing performing unit 214 to activate readily a removal processing function, possibly resulting in the uplink interference to be reduced suitably.

Figure 6:
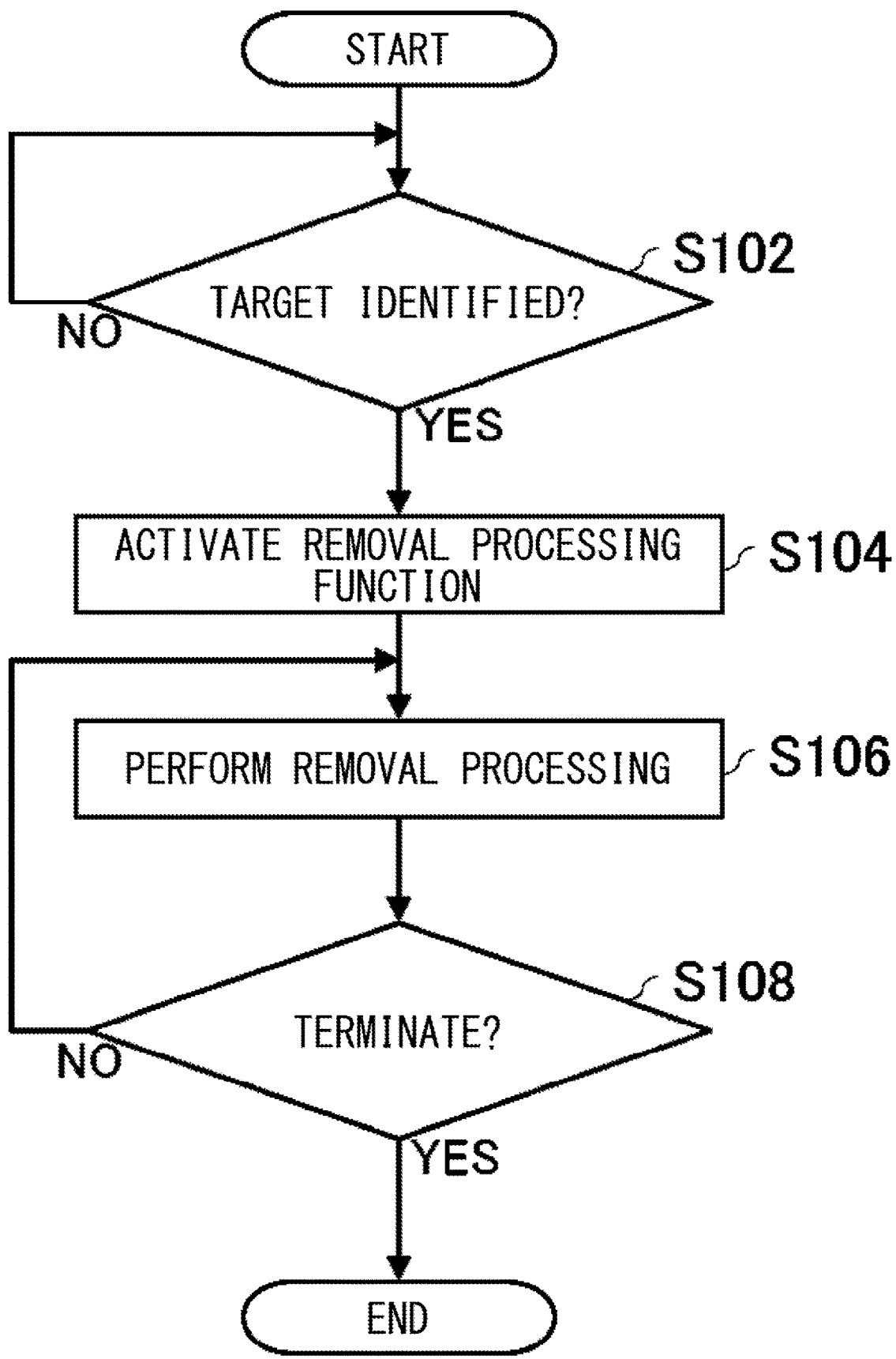
FIG. 6 shows schematically an example of a processing flow by a target identifying unit 212.

FIG. 6 shows schematically an example of a processing flow by the target identifying unit 212. Here, a status where the wireless communication device 200 provides the wireless communication service to the user terminal 300 while the flying body 100 is flying is explained as an initial status.

At Step (the step may be described by the abbreviation "S") 102, it is decided whether the target identifying unit 212 has identified the RRH 230 that forms the cell acting as the interference source (which may be described as the interference source RRH) and the RRH 230 that forms the cell targeted for reducing the interference (which may be described as the reduction target RRH). The target identifying unit 212, for example, identifies the interference source RRH and the reduction target RRH upon receiving the MR of the A3 event from the user terminal 300 located in the area of the wireless communication device 200. The target identifying unit 212 may identify a plurality of interference source RRHs and a plurality of reduction target RRHs when there are a plurality of combinations of the interference source RRH and the reduction target RRH. If decided that the target identifying unit 212 has identified, the process proceeds to S104.

At S104, the removal processing performing unit 214 activates the removal processing function. At S106, the removal processing performing unit 214 performs the removal processing. The removal processing performing unit 214 removes a component of the first transmission radio wave contained as the interference wave in the second reception radio wave, based on the first reception radio wave in which the interference source RRH received the first transmission radio wave which includes the first signal transmitted by the user terminal 300 which is located in the area of the cell acting as the interference source and has transmitted the MR, and the second reception radio wave in which the reduction target RRH received the second transmission radio wave which includes the second signal transmitted by the user terminal 300 which is located in the area of the cell targeted for reducing the interference source. The removal processing performing unit 214 may perform the removal processing for a plurality of user terminals 300 located in the area of the cell targeted for reducing the interference.

The removal processing performing unit 214 performs the removal processing until it is decided that the removal processing is to be terminated. The removal processing performing unit 214 may decide that the removal processing is to be terminated according to any condition. For example, the removal processing performing unit 214 decides that the removal processing is to be terminated when a predetermined period is expired from the activation of the removal processing function at S104. In addition, for example, the removal processing performing unit 214 decides that the removal processing is to be terminated when the interference does not occur such as when the MR of the A3 event is not transmitted from any user terminal 300.

Figure 7:
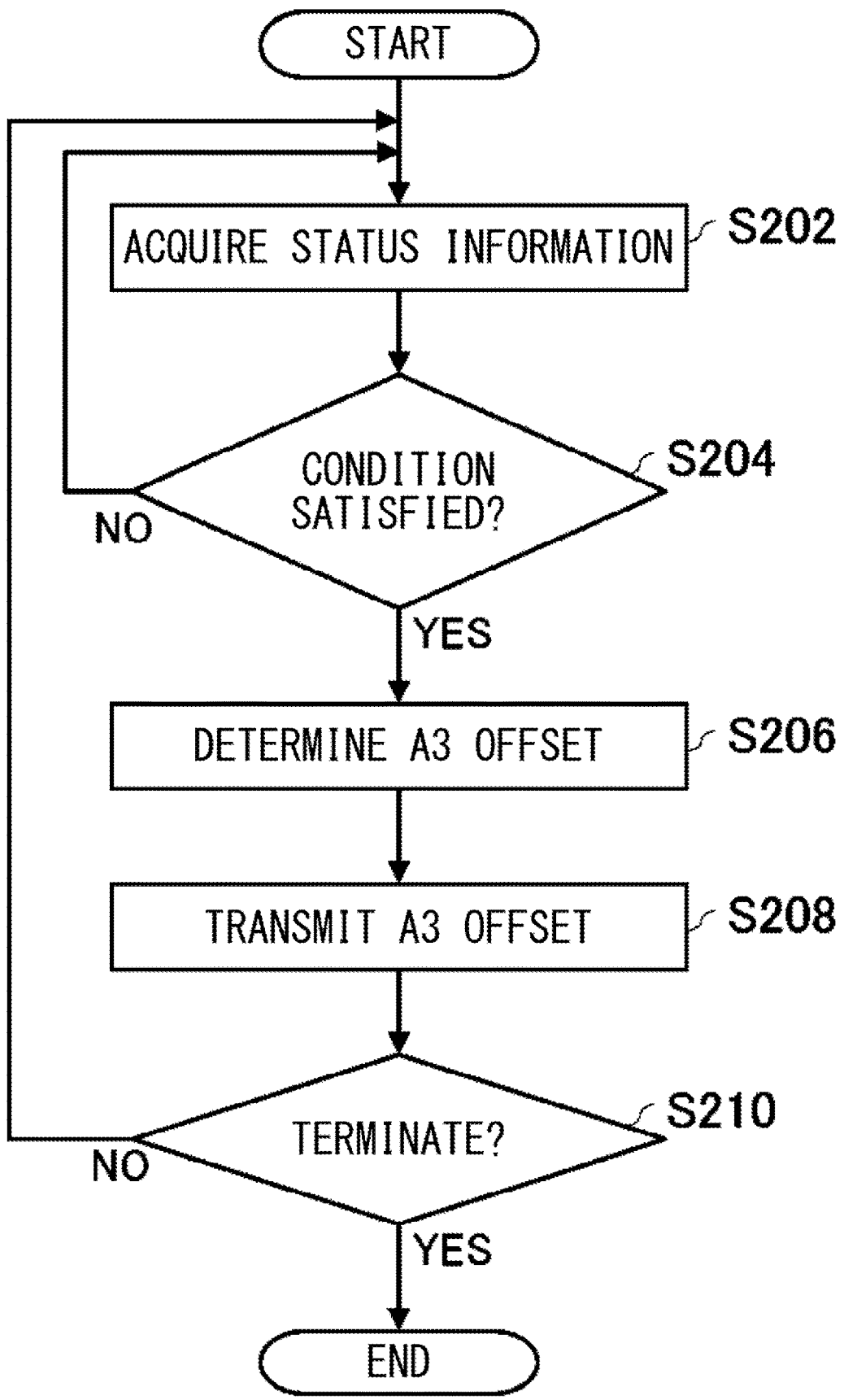
FIG. 7 shows schematically an example of a processing flow by a BBU 210.

FIG. 7 shows schematically an example of a processing flow by the BBU 210. Here, a flow of processing is shown schematically where the user terminal 300 located in the area of the wireless communication device 200 stores the default offset of the A3 event and changes the offset depending on the condition.

At S202, the status information acquisition unit 216 acquires the status information that indicates the status of the flying body 100 having the wireless communication device 200 mounted thereto. At S204, the status information acquisition unit 216 decides whether the status of the flying body 100 indicated by the status information acquired at S202 satisfies a predetermined condition. If decided that it is satisfied, the process proceeds to S206.

At S206, the offset determination unit 218 determines the offset at the A3 event based on the condition satisfied at S204. The offset determination unit 218, for example, determines an offset smaller than the offset stored in the user terminal 300 when a magnitude of the flight vibration of the flying body 100 is greater than the predetermined magnitude. The offset determination unit 218 may determine a reduction amount of the offset of the A3 event when the magnitude of the flight vibration of the flying body 100 is greater than the predetermined magnitude.

At S208, the offset transmission unit 220 transmits the offset determined at S206 to the user terminal 300 located in the area of the wireless communication device 200. The offset transmission unit 220 may transmit, when the reduction amount of the offset of the A3 event is determined at S206, the reduction amount to the user terminal 300 located in the area of the wireless communication device 200.

At S210, it is decided whether the change in the offset of the A3 event depending on the condition is to be terminated. If decided that it is not to be terminated, the process returns to S202. At S202, the status information of the flying body 100 is acquired, and at S204, it is decided whether the status of the flying body 100 satisfies the predetermined condition. Here, for example, if the magnitude of the flight vibration of the flying body 100 is reduced lower than the predetermined magnitude, the default value for an A3 offset may be determined as an A3 offset at S206. Thus, the BBU 210 may reduce the offset value of the A3 event lower than the default value only while the magnitude of the flight vibration of the flying body 100 is greater than the predetermined magnitude.

Figure 8:
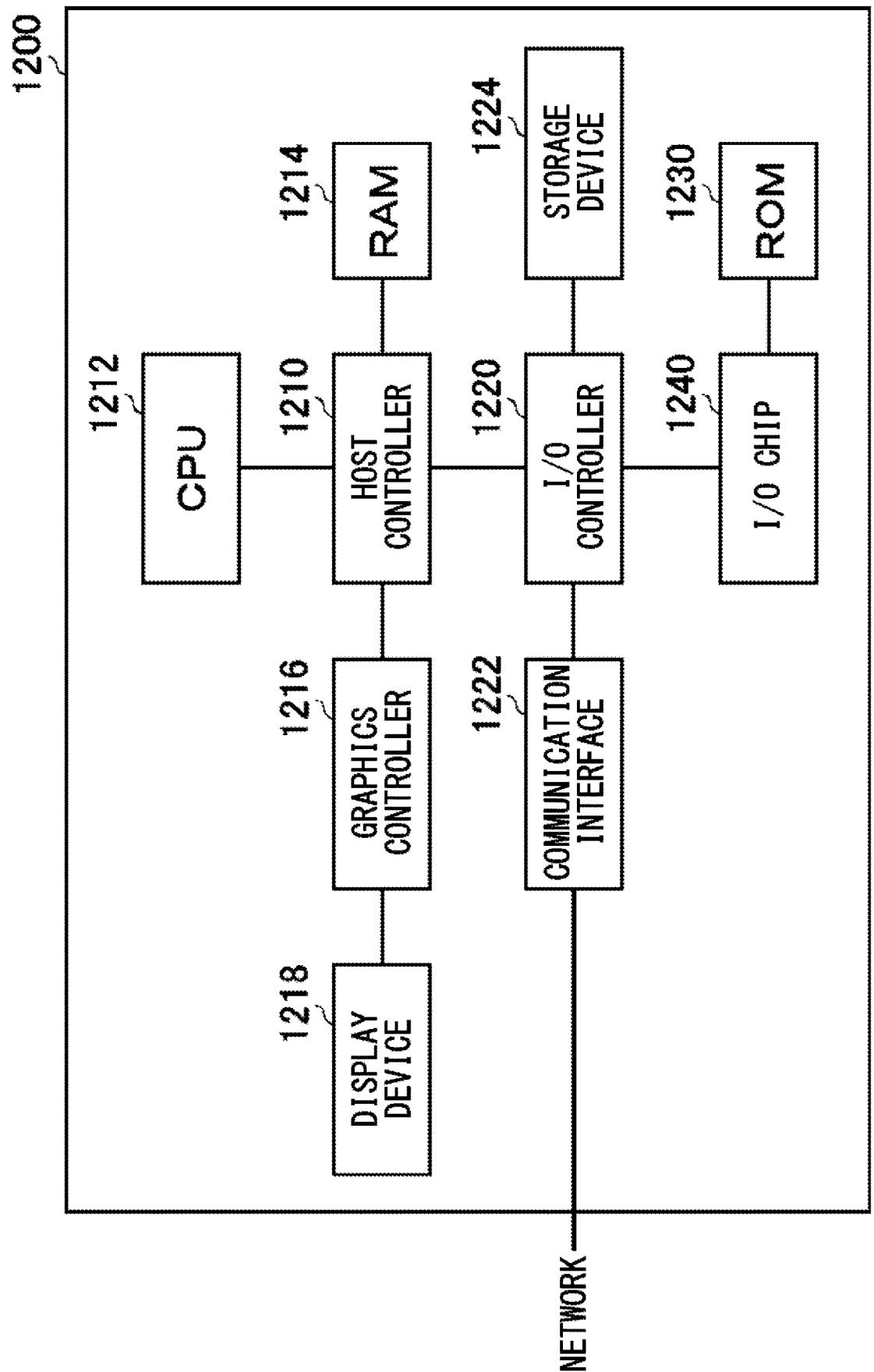
FIG. 8 shows schematically an example of a hardware configuration of a computer 1200 functioning as the wireless communication device 200.

FIG. 8 shows schematically an example of a hardware configuration of a computer 1200 functioning as the wireless communication device 200. A program installed in the computer 1200 can cause the computer 1200 to function as one or more "units" of an apparatus according to the present embodiment, or cause the computer 1200 to perform operations associated with the apparatus or perform one or more "units" thereof according to the present embodiment, and/or cause the computer 1200 to perform the process according to the present embodiment or perform the steps of the process. Such a program may be executed by a CPU 1212 to cause the computer 1200 to perform specific operations associated with some or all of the blocks in the flow charts and block diagrams described in the specification.

The computer 1200 according to the present embodiment includes a CPU 1212, a RAM 1214, and a graphics controller 1216, which are connected to each other via a host controller 1210. The computer 1200 also includes a communication interface 1222, a storage device 1224, and an I/O unit such as an IC card drive, which are connected to the host controller 1210 via an I/O controller 1220. The storage device 1224 may be such as a hard disk drive and a solid state drive. The computer 1200 also includes a legacy I/O unit such as a ROM 1230 and a keyboard, which are connected to the I/O controller 1220 via an I/O chip 1240.

The CPU 1212 operates in accordance with a program stored in the ROM 1230 and the RAM 1214, thereby controlling each unit. The graphics controller 1216 acquires image data generated by the CPU 1212 in a frame buffer provided in the RAM 1214 or in the RAM 1214 itself, so that the image data is displayed on a display device 1218.

The communication interface 1222 communicates with other electronic devices via a network. The storage device 1224 stores a program and data used by the CPU 1212 in the computer 1200. The IC card drive reads out the program or data from an IC card, and/or write the program or data in the IC card.

The ROM 1230 stores a boot program or the like executed by the computer 1200 upon activation, and/or a program dependent on hardware of the computer 1200. The I/O chip 1240 may also connect various I/O units to the I/O controller 1220 via a USB port, a parallel port, a serial port, a keyboard port, a mouse port, or the like.

The program is provided to a computer-readable storage medium such as the IC card. The program is read out from the computer-readable storage medium, installed in the storage device 1224, the RAM 1214, or the ROM 1230 serving also as an example of the computer-readable storage medium, and executed by the CPU 1212. Such a program describes information processing, which is read out by the computer 1200 to link the program with the various types of hardware resources as mentioned above. The apparatus or method may be configured by implementing information operation or processing using the computer 1200.

For example, upon performing the communication between the computer 1200 and an external device, the CPU 1212 may execute a communication program loaded in the RAM 1214 and, based on the processing described in the communication program, instruct the communication interface 1222 to perform communication processing. The communication interface 1222, under control of the CPU 1212, reads out transmission data stored in a transmission buffer processing area provided in a recording medium such as the RAM 1214, the storage device 1224, or the IC card, and transmits the read-out transmission data to the network, or otherwise writes the received data received from the network in a reception buffer processing area or the like provided on the recording medium.

In addition, the CPU 1212 may allow the RAM 1214 to read out all or necessary parts of a file or database stored in an external recording medium, such as the storage device 1224 and the IC card, to perform various types of processing for the data stored on the RAM 1214. The CPU 1212 then writes back the processed data in the external recording medium.

Various types of information such as various types of programs, data, tables, and databases may be stored in the recording medium for information processing. On the data read out from the RAM 1214, the CPU 1212 may perform various types of processing including various types of operations, information processing, condition determination, conditional branching, unconditional branching, and information retrieval/conversion, which are described anywhere in the present disclosure and specified by an instruction sequence of a program, and write back the result in the RAM 1214. The CPU 1212 may also retrieve information in a file or database in the recording medium. For example, when the recording medium stores a plurality of entries each having a first attribute value associated with a second attribute value, the CPU 1212 may retrieve an entry from the plurality of entries that meets a condition where the first attribute value is specified, read out the second attribute value stored in the entry, thereby acquiring the second attribute value associated with the first attribute value that satisfies a predetermined condition.

The programs or software modules described above may be stored on the computer 1200 or a computer-readable storage medium in the vicinity of the computer 1200. A recording medium such as a hard disk or RAM provided in a server system connected to a dedicated communication network or the Internet is usable as the computer-readable storage medium, thereby providing the program to the computer 1200 via the network.

In the flow charts and block diagrams in the present embodiment, the blocks may represent "units" of an apparatus having a role to perform steps of the process for performing operations or to perform the operations. A specific step or "unit" may be implemented by a dedicated circuit, a programmable circuit provided along with computer-readable instructions stored on a computer-readable storage medium, and/or a processor provided along with the computer-readable instructions stored on the computer-readable storage medium. The dedicated circuit may include a digital and/or analog hardware circuit, or may include an integrated circuit (IC) and/or a discrete circuit. The programmable circuit may include a reconfigurable hardware circuit, such as a field programmable gate array (FPGA) and a programmable logic array (PLA), for example, including AND, OR, XOR, NAND, NOR, as well as other logical operations, flip-flops, registers, and memory elements.

The computer-readable storage medium may include any tangible device that can store instructions to be executed by a suitable device, so that the computer-readable storage medium having instructions stored thereon comprises a product including instructions that can be executed to configure means for performing operations specified in the flow charts or block diagrams. Examples of the computer-readable storage medium may include an electronic storage medium, a magnetic storage medium, an optical storage medium, a magneto-electric storage medium, and a semiconductor storage medium, or the like. More specific examples of the computer-readable storage medium may include a floppy (registered trademark) disk, a diskette, a hard disk, random access memory (RAM), read-only memory (ROM), erasable programmable read-only memory (EPROM or flash memory), electrically-erasable programmable read-only memory (EEPROM), static random access memory (SRAM), compact disc read-only memory (CD-ROM), a digital versatile disk (DVD), a Blu-ray (registered trademark) disk, a memory stick, and an integrated circuit card, or the like.

The computer-readable instructions may include assembler instructions, instruction set architecture (ISA) instructions, machine instructions, machine-dependent instructions, microcodes, firmware instructions, status setting data, or any of source codes or object codes described in any combination of one or more programming languages, including object-oriented programming languages, such as Smalltalk (registered trademark), JAVA (registered trademark), or C++, and conventional procedural programming languages, such as C programming languages or similar programming languages.

The computer-readable instructions may be provided to a processor of a general-purpose computer, a dedicated computer or other programmable data processing apparatuses, or a programmable circuit, locally or via the local area network (LAN) or the wide area network (WAN) such as the Internet, so that the processor of the general-purpose computer, the dedicated computer or other programmable data processing apparatuses, or the programmable circuit executes the computer-readable instructions to generate means for performing the operations specified in the flow charts or block diagrams. The processors include a computer processor, a processing unit, a microprocessor, a digital signal processor, a controller, and a microcontroller, or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: network
22: gateway
31: transmission signal
32: transmission signal
41: interference signal
51: signal
52: signal
80: communication satellite
100: flying body
102: body unit
104: main wing unit
106: propeller
108: skid
110: wheel
112: solar cell panel
120: multi-cell
130, 131, 132: cell
200: wireless communication device
210: BBU
212: target identifying unit
214: removal processing performing unit
216: status information acquisition unit
218: offset determination unit
220: offset transmission unit
230: RRH
300, 301, 302: user terminal
400: management apparatus
501, 502: reception radio wave band
601: reception signal
602: reception signal
603: reception signal
1200: computer
1210: host controller
1212: CPU
1214: RAM
1216: graphics controller
1218: display device
1220: I/O controller
1222: communication interface
1224: storage device
1230: ROM
1240: I/O chip

What is claimed is:

1. A wireless communication device configured to be mounted to a flying body to radiate a plurality of beams toward the ground, thereby forming a multi-cell to provide wireless communication services to a user terminal in the multi-cell, comprising:
a plurality of radio units including a first radio unit and a second radio unit; and
a control unit configured to control each of the plurality of radio units to form a cell, thereby forming the multi-cell,
wherein the control unit has:
a removal processing performing unit configured to, based on a first reception radio wave in which the first radio unit received a first transmission radio wave which includes a first signal transmitted by a first user terminal located in an area of a first cell formed by the first radio unit, and a second reception radio wave in which the second radio unit received a second transmission radio wave which includes a second signal transmitted by a second user terminal located in an area of a second cell formed by the second radio unit, perform removal processing to remove a component of the first transmission radio wave contained as an interference wave in the second reception radio wave, and
wherein the removal processing performing unit removes the component of the first transmission radio wave from the second reception radio wave by identifying the component of the first transmission radio wave contained as the interference wave in the second reception radio wave based on a phase derived from the first reception radio wave.

2. The wireless communication device according to claim 1, wherein the removal processing performing unit acquires the second signal from the second reception radio wave by performing the removal processing.

3. The wireless communication device according to claim 2, wherein the removal processing performing unit further performs the removal processing to remove the component of the first transmission radio wave contained as the interference wave in the second reception radio wave by utilizing an UL-CoMP (UpLink-Coordinated Multi Point) technique.

4. The wireless communication device according to claim 2, wherein:
the control unit has:
a target identifying unit configured to identify the first radio unit that forms a cell acting as an interference source and the second radio unit that forms a cell targeted for reducing the interference among the plurality of radio units.

5. The wireless communication device according to claim 2, wherein:
the radio unit is an RRH (Remote Radio Head); and
the control unit is a BBU (Base Band Unit).

6. The wireless communication device according to claim 1, wherein the removal processing performing unit further performs the removal processing to remove the component of the first transmission radio wave contained as the interference wave in the second reception radio wave by utilizing an UL-CoMP (UpLink-Coordinated Multi Point) technique.

7. The wireless communication device according to claim 6, wherein the removal processing performing unit acquires the second signal from the second reception radio wave by synthesizing a signal acquired from the first reception radio wave and a signal acquired from the second reception radio wave to remove the first signal contained as an interference signal in the second reception radio wave.

8. The wireless communication device according to claim 7, wherein the removal processing performing unit assumes, based on the first reception radio wave received by the first radio unit through a first plurality of antennas and the second reception radio wave received by the second radio unit through a second plurality of antennas, that a cell composed of the first plurality of antennas and the second plurality of antennas has received the first reception radio wave and the second reception radio wave, thereby removing the component of the first transmission radio wave contained as the interference wave in the second reception radio wave.

9. The wireless communication device according to claim 6, wherein the removal processing performing unit assumes, based on the first reception radio wave received by the first radio unit through a first plurality of antennas and the second reception radio wave received by the second radio unit through a second plurality of antennas, that a cell composed of the first plurality of antennas and the second plurality of antennas has received the first reception radio wave and the second reception radio wave, thereby removing the component of the first transmission radio wave contained as the interference wave in the second reception radio wave.

10. The wireless communication device according to claim 1, wherein:
the control unit has:
a target identifying unit configured to identify the first radio unit that forms a cell acting as an interference source and the second radio unit that forms a cell targeted for reducing the interference among the plurality of radio units.

11. The wireless communication device according to claim 10, wherein the target identifying unit identifies the first radio unit from the plurality of radio units based on a measurement report which is transmitted by the second user terminal located in the area of the second cell and reports the condition of a radio wave received by the second user terminal.

12. The wireless communication device according to claim 11, wherein the target identifying unit, by referring to the measurement report transmitted by the second user terminal located in the area of the second cell when the reception quality of a radio wave from a neighboring cell is higher than the reception quality of a radio wave from the second cell by a predetermined or larger amount of offset, identifies the radio unit that forms the neighboring cell in the measurement report as the first radio unit.

13. The wireless communication device according to claim 12, wherein:
the control unit has:
a status information acquisition unit configured to acquire status information that indicates a status of the flying body;
an offset determination unit configured to determine the offset based on the status information; and
an offset transmission unit configured to transmit the offset determined by the offset determination unit to the user terminal located in the area of the multi-cell.

14. The wireless communication device according to claim 13, wherein the offset determination unit decreases the offset when a magnitude of flight vibration of the flying body is greater than a predetermined magnitude.

15. The wireless communication device according to claim 1, wherein:
the radio unit is an RRH (Remote Radio Head); and
the control unit is a BBU (Base Band Unit).

16. A system comprising:
the wireless communication device according to claim 1; and
the flying body.

17. A non-transitory computer-readable storage medium having recorded thereon a program to cause a computer to function as:
a wireless communication device configured to be mounted to a flying body to radiate a plurality of beams toward the ground, thereby forming a multi-cell to provide wireless communication services to a user terminal in the multi-cell, comprising:
a plurality of radio units including a first radio unit and a second radio unit; and
a control unit configured to control each of the plurality of radio units to form a cell, thereby forming the multi-cell,
wherein the control unit has:
a removal processing performing unit configured to, based on a first reception radio wave in which the first radio unit received a first transmission radio wave which includes a first signal transmitted by a first user terminal located in an area of a first cell formed by the first radio unit, and a second reception radio wave in which the second radio unit received a second transmission radio wave which includes a second signal transmitted by a second user terminal located in an area of a second cell formed by the second radio unit, perform removal processing to remove a component of the first transmission radio wave contained as an interference wave in the second reception radio wave, and
wherein the removal processing performing unit removes the component of the first transmission radio wave from the second reception radio wave by identifying the component of the first transmission radio wave contained as the interference wave in the second reception radio wave based on a phase derived from the first reception radio wave.

18. A control method performed by a wireless communication device configured to be mounted to a flying body to radiate a plurality of beams toward the ground, thereby forming a multi-cell to provide wireless communication services to a user terminal in the multi-cell, comprising a plurality of radio units including a first radio unit and a second radio unit, and a control unit configured to control each of the plurality of radio units to form a cell, thereby forming the multi-cell, wherein the control method comprises:
performing removal processing configured to, based on a first reception radio wave in which the first radio unit received a first transmission radio wave which includes a first signal transmitted by a first user terminal located in an area of a first cell formed by the first radio unit, and a second reception radio wave in which the second radio unit received a second transmission radio wave which includes a second signal transmitted by a second user terminal located in an area of a second cell formed by the second radio unit, perform removal processing to remove a component of the first transmission radio wave contained as an interference wave in the second reception radio wave, wherein
the removal processing removes the component of the first transmission radio wave from the second reception radio wave by identifying the component of the first transmission radio wave contained as the interference wave in the second reception radio wave based on a phase derived from the first reception radio wave.

* * * * *